United States Patent
Yu et al.

(10) Patent No.: US 10,091,273 B2
(45) Date of Patent: Oct. 2, 2018

(54) DATA COLLECTING DEVICE FOR PHOTOVOLTAIC DEVICE

(71) Applicant: LSIS CO., LTD., Anyang-si, Gyeonggi-do (KR)

(72) Inventors: Young Gyu Yu, Seoul (KR); Choong Kun Cho, Gunpo-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 86 days.

(21) Appl. No.: 14/874,185

(22) Filed: Oct. 2, 2015

(65) Prior Publication Data
US 2016/0212196 A1    Jul. 21, 2016

(30) Foreign Application Priority Data
Jan. 19, 2015   (KR) .................. 10-2015-0008925

(51) Int. Cl.
*H04L 29/08* (2006.01)
*H02S 50/00* (2014.01)
*H02J 3/38* (2006.01)
*H02J 13/00* (2006.01)

(52) U.S. Cl.
CPC .............. *H04L 67/06* (2013.01); *H02J 3/383* (2013.01); *H02J 13/001* (2013.01); *H02J 13/0013* (2013.01); *H02S 50/00* (2013.01); *H04L 67/12* (2013.01); *Y02E 10/563* (2013.01); *Y02E 40/72* (2013.01); *Y02E 60/7807* (2013.01); *Y04S 10/123* (2013.01); *Y04S 10/40* (2013.01); *Y04S 40/12* (2013.01)

(58) Field of Classification Search
CPC .............. H04L 29/08072; H04L 29/06; H04L 29/0809; H04L 29/08117; G06Q 30/02; H04W 52/24; H04W 52/50; H04W 52/367; H04W 52/12; H04W 52/40
USPC ........................................... 709/209
See application file for complete search history.

(56) References Cited

U.S. PATENT DOCUMENTS

| | | | |
|---|---|---|---|
| 7,058,705 B1 * | 6/2006 | Fukasawa ............ | G06F 21/608 709/203 |
| 2003/0103520 A1 * | 6/2003 | Chen ..................... | H04L 47/14 370/444 |
| 2008/0097655 A1 * | 4/2008 | Hadar .................. | H02J 13/002 700/286 |
| 2012/0127626 A1 | 5/2012 | Chang et al. | |

(Continued)

FOREIGN PATENT DOCUMENTS

| | | |
|---|---|---|
| EP | 2701261 | 2/2014 |
| EP | 2736144 | 5/2014 |

(Continued)

OTHER PUBLICATIONS

European Patent Office Application No. 15189936.6, Search Report dated Jul. 1, 2016, 17 pages.

(Continued)

*Primary Examiner* — Mahran Y Abu Roumi
(74) *Attorney, Agent, or Firm* — K&L Gates LLP

(57) ABSTRACT

A data collecting device collecting state information of a photovoltaic device is provided. The data collecting device includes a reception unit collecting the state information, and a transmitting unit transmitting the state information according to a state information transmission time based on a state information group including the state information.

6 Claims, 7 Drawing Sheets

(56) References Cited

U.S. PATENT DOCUMENTS

| | | | |
|---|---|---|---|
| 2012/0249048 A1 | 10/2012 | Nishibayashi et al. | |
| 2013/0127626 A1* | 5/2013 | Yoo | G01R 31/3689 340/636.19 |
| 2014/0050205 A1* | 2/2014 | Ahn | H04W 52/146 370/336 |
| 2014/0084686 A1* | 3/2014 | Nishibayashi | H02J 3/32 307/26 |
| 2015/0126241 A1* | 5/2015 | Hwang | H04W 52/267 455/522 |

FOREIGN PATENT DOCUMENTS

| | | |
|---|---|---|
| EP | 2793344 | 10/2014 |
| EP | 2881911 | 6/2015 |
| JP | H01317100 | 12/1989 |
| JP | H0568289 A | 3/1993 |
| JP | 2001134301 | 5/2001 |
| JP | 2010220036 A | 9/2010 |
| JP | 2012195705 A | 10/2012 |
| JP | 2015080116 | 4/2015 |
| WO | 2011118007 | 9/2011 |
| WO | 2014/024463 | 2/2014 |

OTHER PUBLICATIONS

Japanese Office Action for related Japanese Application No. 2015-216681; action dated Feb. 27, 2018; (2 pages).

* cited by examiner

DATA COLLECTING DEVICE FOR PHOTOVOLTAIC DEVICE

CROSS-REFERENCE TO RELATED APPLICATIONS

Pursuant to 35 U.S.C. § 119(a), this application claims the benefit of earlier filing date and right of priority to Korean Patent Application No. 10-2015-0008925, filed on Jan. 19, 2015 the contents of which are all hereby incorporated by reference herein in its entirety.

BACKGROUND

The present disclosure relates to a photovoltaic device.

Interest in alternative energy is picking up due to depletion of fossil energy such as petroleum and concern about environmental pollution. Among them, photovoltaic power generation is being spotlighted which generates electricity on a mass scale by deploying a panel in large scale with a photovoltaic cell attached thereon to use solar energy. Since the photovoltaic power generation uses solar energy that is unlimited and pollution-free, there is no occurrence of air pollution or wastes.

There are two photovoltaic power generation types of an off-grid type and on-grid type. In the off-grid type, a photovoltaic device is connected to a stand-alone load that is not connected to a grid. In the on-grid type, a photovoltaic device is connected to an existing grid. The photovoltaic device transmits electricity, which is generated in the daytime, to the grid and receives electricity from the grid at night or in case of rain. In order to efficiently use the on-grid type photovoltaic system, a photovoltaic system is introduced for storing idle power in a Battery Energy Storage System (BESS) in case of a light load, and for supplying power discharged from the BESS in addition to power from the photovoltaic device to the grid in case of overload.

An amount of power generation from this photovoltaic device is greatly influenced by environmental factors such as weather or time. Accordingly, it is necessary to continuously detect these environmental elements. In addition, the photovoltaic device requires a relatively wide area for absorbing a large amount of solar light. Accordingly, there are many cases where the photovoltaic device is located remotely from a general residence area or a working area of a manager who manages the photovoltaic device. Due to this reason, the photovoltaic device includes a data logger for collecting a state of the photovoltaic device and transmit it to the outside thereof.

SUMMARY

Embodiments provide a data collecting device for efficiently and accurately collecting a state of a photovoltaic device.

In one embodiment, a data collecting device collecting state information of a photovoltaic device, includes: a controller determining a stat information transmission time of each of a plurality of state information groups classifying the state information; and a communication unit receiving the state information from the photovoltaic device to transmit the state information at a state information transmission time, wherein the state information transmission time is based on a transmission period of each of the plurality of state information groups and the transmission periods of the plurality of state information groups are different.

The plurality of state information groups may include first and second state information groups, a transmission period of the first state information group may be shorter than that of the second state information group, and the first state information group may include information for influencing system stability of the photovoltaic device.

The first state information group may include information on whether the photovoltaic device is failed.

The second state information group may include information on instantaneous power generation of the photovoltaic device.

The state information group may be any one of first, second, and third state information groups, a transmission period of the first state information group may be shorter than that of the second state information group, a transmission period of the third state information group may be longer than that of the second state information group, the first state information group may include information for influencing system stability of the photovoltaic device, the first state information group may include the information on instantaneous power generation of the photovoltaic device, the third state information group may include the information on accumulated power generation of the photovoltaic device, and the information on accumulated power generation may include at least any one of an accumulated amount of power generation and an accumulated number of use days of an element.

The state information transmission time may be determined based on a random value calculated in the transmission period.

In another embodiment, an operation method of a data collecting device collecting state information of a photovoltaic device, includes: collecting the state information; and transmitting the state information according to a state information transmission time based on a state information group including the state information.

The details of one or more embodiments are set forth in the accompanying drawings and the description below. Other features will be apparent from the description and drawings, and from the claims.

DETAILED DESCRIPTION OF THE EMBODIMENTS

Figure 1:
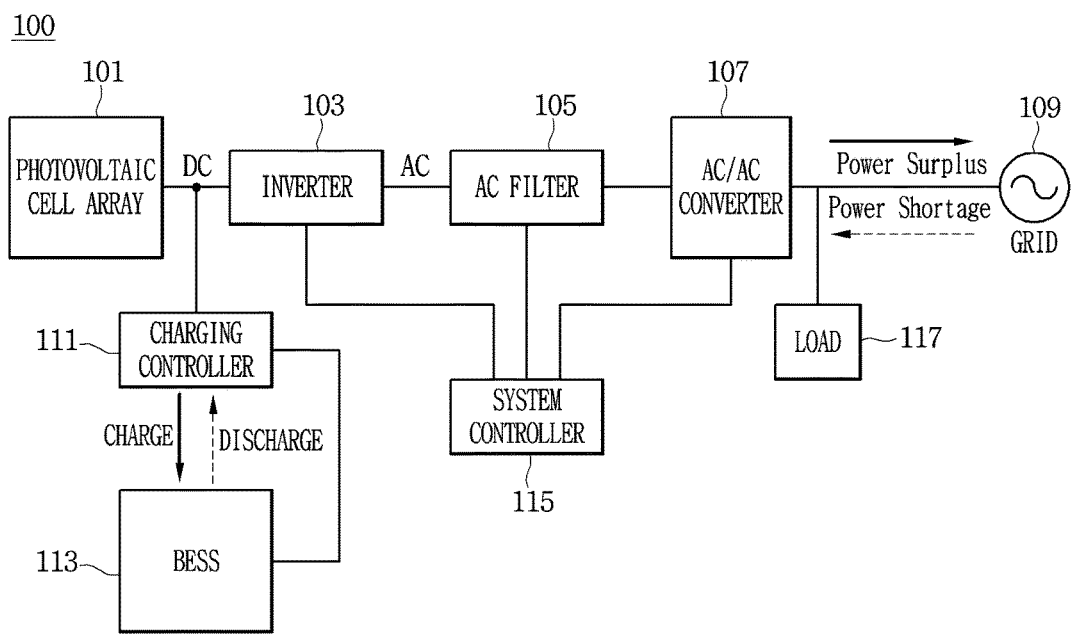
FIG. 1 is a block diagram of a photovoltaic device according to an embodiment.

Reference will now be made in detail to the embodiments of the present disclosure, examples of which are illustrated in the accompanying drawings.

A data collecting device of a photovoltaic device according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Hereinafter, embodiments of the present invention will be described in detail with reference to the accompanying drawings so that the present invention can be easily realized by those skilled in the art. The present invention can be practiced in various ways and is not limited to the embodiments described herein. In the drawings, parts which are not related to the description are omitted to clearly set forth the present invention and similar elements are denoted by similar reference symbols throughout the specification.

In addition, when an element is referred to as "comprising" or "including" a component, it does not preclude another component but may further include the other component unless the context clearly indicates otherwise.

Hereinafter a photovoltaic device according to an embodiment will be described with reference to FIGS. 1 and 2.

FIG. 1 is a block diagram of a photovoltaic device according to an embodiment.

A photovoltaic device 100 according to an embodiment includes a photovoltaic cell array 101, an inverter 103, an AC filter 105, an AC/AC converter 107, a grid 109, a charging controller 111, a Battery Energy Storage System (BESS) 113, a system controller 115, and a load 117.

The photovoltaic cell array 101 is a combination of a plurality of photovoltaic cell modules. The photovoltaic cell module is a device, which is obtained by connecting a plurality of photovoltaic cells in serial or in parallel, for converting solar energy to electrical energy to generate a voltage and current. Accordingly, the photovoltaic cell array 101 absorbs the solar energy to convert it to the electrical energy.

The inverter 103 inverts DC power to AC power. The inverter 103 receives the DC power supplied by the photovoltaic cell array 101 or the DC power discharged from the BESS 113 to invert the DC power to the AC power.

The AC filter 105 filters noise from the inverted AC power.

The AC/AC converter 107 performs conversion on the magnitude of the AC power that the noise is filtered and supplies the magnitude-converted AC power to the grid 109 and load 117.

The grid 109 is a system in which a power plant, a substation, a transmission/distribution line, and a load are integrated into one to generate and use power.

The charging controller 111 controls charge of and discharge from the BESS 113. When the grid 109 or load 117 is overloaded, the charging controller 111 receives power from the BESS 113 to deliver the power to the grid 109 or load 117. When the grid 109 or load 117 is light-loaded, the charging controller 111 receives power from the photovoltaic cell array 101 to deliver it to the BESS 113.

The BESS 113 is charged with electrical energy received from the photovoltaic cell array 101 and discharges the electrical energy according to a power supply-demand situation of the grid 109 or load 117. In detail, when the grid 109 or load 117 is light-loaded, the BESS 113 receives idle power from the photovoltaic cell array 101 to be charged therewith. When the grid 109 or load 117 is over-loaded, the BESS 113 discharges the power to supply to the grid 109. The power supply-demand situation of the grid is differed for each time zone. Accordingly, it is inefficient that the photovoltaic device 100 uniformly supply the power generated by the photovoltaic cell array 101 without consideration of the power supply-demand situation. Therefore the photovoltaic device 100 adjusts a power supply amount according to the power supply-demand situation of the grid 109 or load 117 by using the BESS 113. Through this, the photovoltaic device 100 may efficiently supply power to the grid 109 or load 117.

The system controller 115 controls operations of the charging controller 111, inverter 103, AC filter 105, and AC/AC converter 107.

The load 117 receives to consume the electrical energy.

Figure 2:
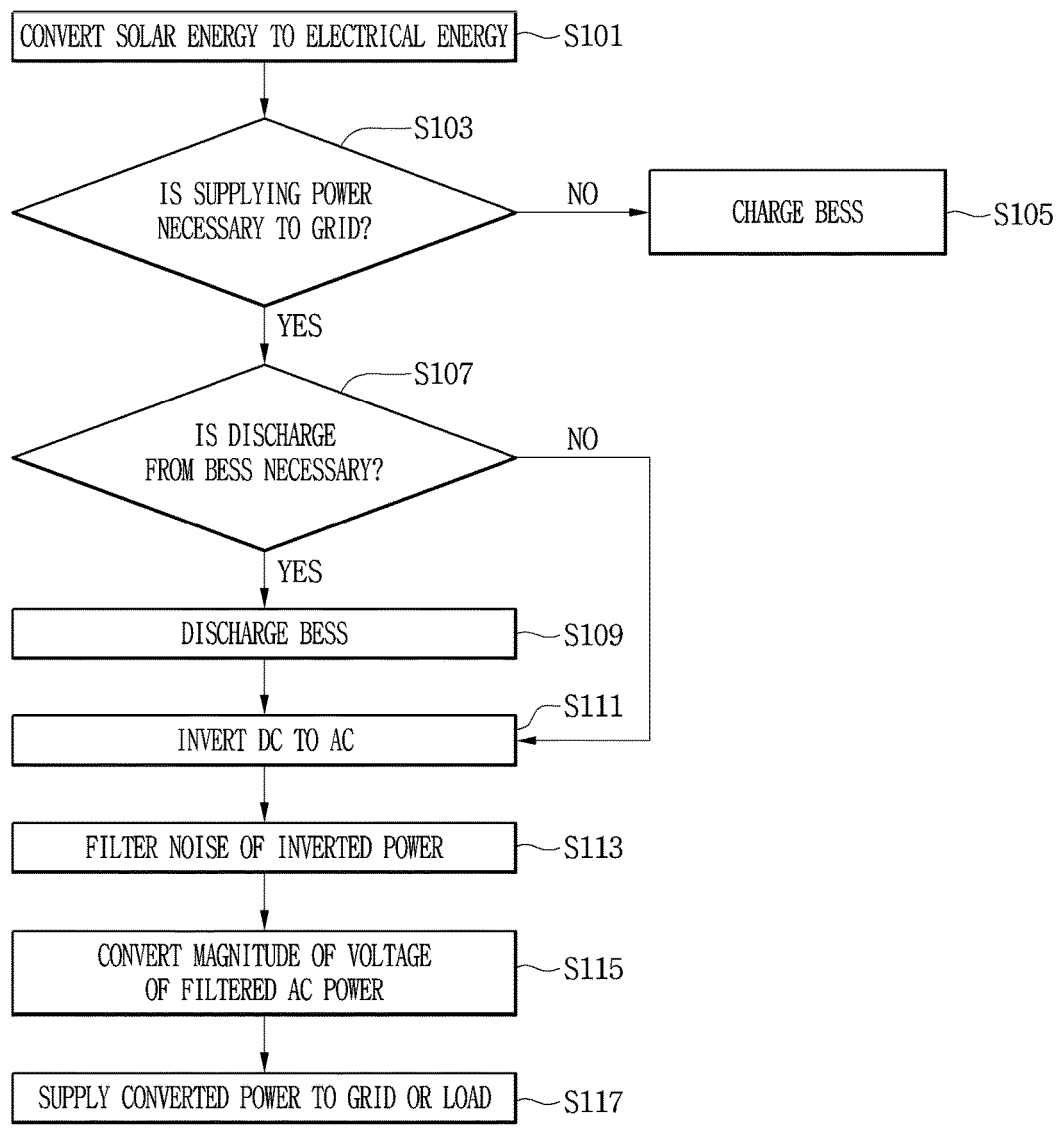
FIG. 2 is an operation flowchart of a photovoltaic device according to an embodiment.

FIG. 2 is an operation flowchart of a photovoltaic device according to an embodiment.

Accordingly, the photovoltaic cell array 101 converts the solar energy to the electrical energy (operation S101).

The system controller 115 determines whether supplying power to the grid 109 is necessary (operation S103). Whether the supplying power to the grid 109 is necessary may be determined on the basis of whether the grid 109 is overloaded or light-loaded.

When the supplying power to the grid 109 is not necessary, the system controller 115 controls the charging controller 111 to charge the BESS 113 (operation S105). In detail, the system controller 115 may generate a control signal for controlling the charging controller 111. The charging controller 111 may receive the control signal to discharge the BESS 113.

The system controller 115 determines whether discharge from the BESS 113 is necessary (operation S107). The system controller 115 may determine whether the discharge from the BESS 113 is necessary in a case where power demand of the grid 109 is not satisfied only with electrical energy supplied by the photovoltaic cell array 101. In addition, the system controller 11 may determine whether the BESS 113 stores enough energy to be discharged.

When the discharge from the BESS 113 is necessary, the system controller 115 controls the charging controller 111 to discharge the BESS 113. In detail, the system controller 115 may generate a control signal for controlling the charging controller 111. The charging controller 111 may receive the control signal to charge the BESS 113.

The inverter 103 inverts, to AC energy, the electrical energy discharged from the BESS 113 and the electrical energy converted by the photovoltaic cell array 101 (operation S111). At this point, the on-grid photovoltaic device 100 conducts, with only one inverter 103, the inversion on the electrical energy discharged from the BESS 113 and the electrical energy converted by the photovoltaic cell array 101. Each electrical device has an available power limit. This limit is divided into an instant limit and a long time use limit, and regulatory power is determined as maximum power that does not damage a device and is available for a long time. In order to maximize efficiency of the inverter 103, the BESS 113 and the photovoltaic cell array 101 are required to supply power so that the inverter 103 uses power of about 40% to about 60% of the regulatory power.

The AC filter 105 filters noise from the inverted AC power (operation S113).

The AC/AC converter 107 performs conversion on the magnitude of voltage of the filtered AC power to supply power to the grid 109 or load 117 (operation S115).

The photovoltaic device 100 supplies the converted power to the grid 109 or load 117 (operation S117).

For the photovoltaic device 100 according to the embodiments of FIGS. 1 and 2, a manager of the photovoltaic device 100 is difficult to know a current state of or a surrounding environment state of the photovoltaic device 300. In particular, in order to absorb a lot of solar light, a photovoltaic device, which requires a relatively wide area, is usually located remotely from a general residence area or a working area of the manager who manages the photovoltaic device. Accordingly, the photovoltaic device requires a sensing unit for sensing the state and surrounding environment of the photovoltaic device, and a data collecting device (e.g. data logger) for receiving information representing the state of and the surrounding environment state of the photovoltaic device 300 from the sensing unit to transmit the information to the outside thereof. The sensing unit and the data logger will be described with reference to FIGS. 3 to 9.

Figure 3:
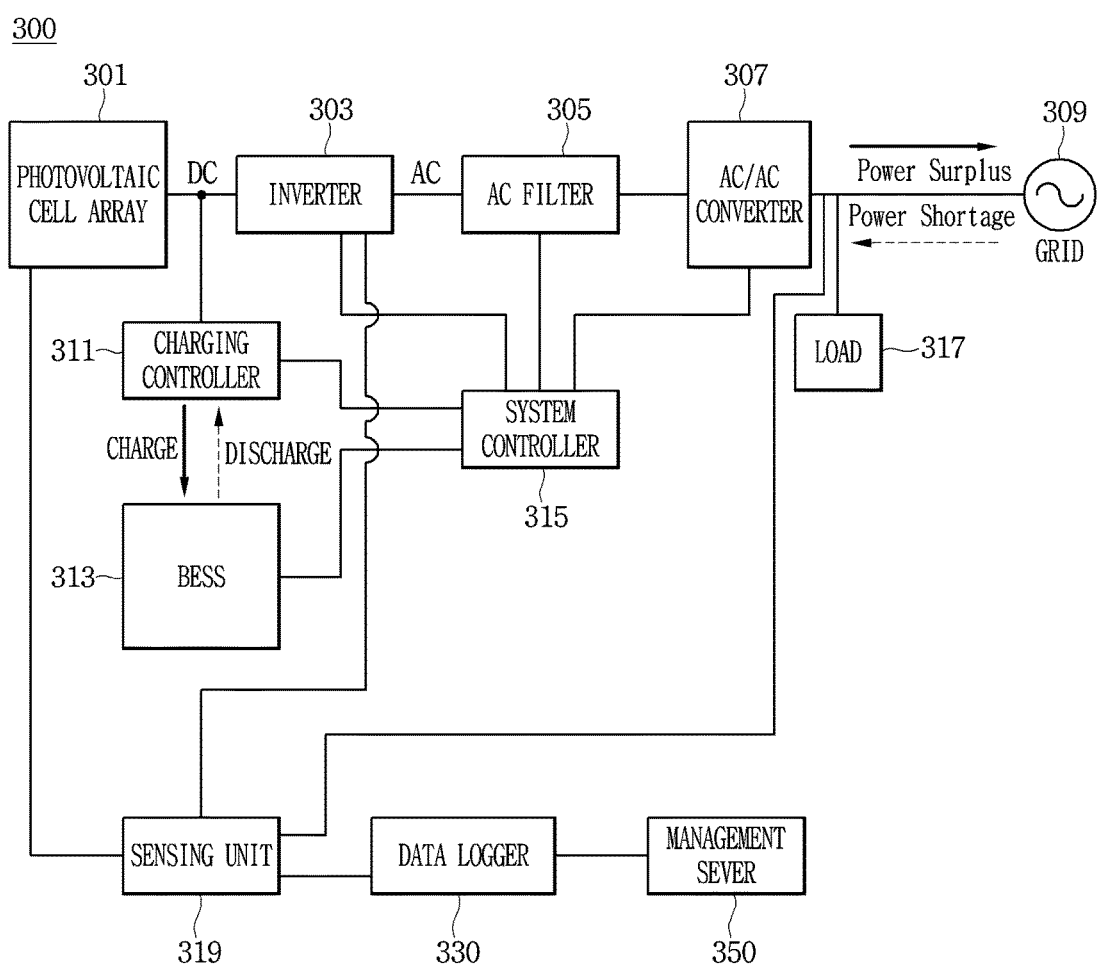
FIG. 3 is a block diagram illustrating a photovoltaic device according to another embodiment and a management server connected to the photovoltaic device.

FIG. 3 is a block diagram illustrating a photovoltaic device according to another embodiment and a management server connected to the photovoltaic device.

A photovoltaic device 300 according to the other embodiment includes a photovoltaic array 301, an inverter 303, an AC filter 305, an AC/DC converter 307, a grid 309, a charging controller 311, a BESS 313, a system controller 315, a load 317, a sensing unit 319, and a data collecting device (i.e. data logger) 330.

The photovoltaic cell array 301 absorbs the solar energy to convert it to the electrical energy.

The inverter 303 inverts DC power to AC power. The inverter 303 receives, through the charging controller 311, the DC power supplied by the photovoltaic cell array 301 or the DC power discharged from the BESS 113 to invert it to the AC power.

The AC filter 305 filters noise from the inverted AC power.

The AC/AC converter 307 performs conversion on the magnitude of the AC power that the noise is filtered and supplies the magnitude-converted AC power to the grid 309 and load 317.

The grid 309 is a system in which a power plant, a substation, a transmission/distribution line, and a load are integrated into one to generate and use power.

The charging controller 311 controls charge of and discharge from the BESS 313. A detailed operation of the charging controller 311 is identical to that of the embodiment of FIG. 1.

The BESS 313 is charged with electrical energy received from the photovoltaic cell array 301 and discharge the electrical energy according to a power supply-demand situation of the grid 309 or load 317. A detailed operation of the BESS 313 is identical to that of the embodiment of FIG. 1.

The system controller 315 controls operations of the charging controller 311, inverter 303, AC filter 305, and AC/AC converter 307.

The load 317 receives to consume the electrical energy.

The sensing unit 319 senses at least any one of a state and surrounding environment state of the photovoltaic device 300. In detail, the sensing unit 319 may sense at least any one of a voltage of power generated by the photovoltaic device 300, solar insolation and a temperature at a place where the photovoltaic device 300 is located, and a temperature in the photovoltaic device 300. Accordingly, the sensing unit 319 may include a plurality of sensors. In detail, the sensing unit 319 may include at least any one of a solar insolation sensor, temperature sensor, and voltage sensor. In a detailed embodiment, some of the plurality of sensors may be connected to the inverter 303 to sense the state of the photovoltaic device 300. For example, the plurality of sensors included in the sensing unit 319 is connected to the inverter 303 to sense the voltage of the power generated from the photovoltaic device 300. In detail, the sensing unit 319 may receive informations on power production and transmission from the inverter 303.

The data logger 330 receives state information representing at least any one of the state and surrounding environment state of the photovoltaic device 300 from the sensing unit 319, and transmits the state information to the management server 350.

The manager of the photovoltaic device 300 may check whether the photovoltaic device 300 is abnormal and a power generation state through the state information transmitted to the management server 350. In detail, the manager of the photovoltaic device 300 may check whether the photovoltaic device 300 is failed when an amount of the power generation is smaller compared to the solar insolation. Accordingly, the manager of the photovoltaic device 300 may inspect the photovoltaic device 300. In another detailed embodiment, when quality of power generated by the photovoltaic device 300 is not good, the manager of the photovoltaic device 300 may estimate a replacement period of an element necessary to the photovoltaic device 300. In another detailed embodiment, when a temperature of the photovoltaic device 300 is excessively high or a surrounding temperature of the photovoltaic device is excessively high, the manager may stop operation of the photovoltaic device 300 for a certain period. In another detailed embodiment, when an owner of the photovoltaic device 300 earns an income for supplying power to the grid 309, the information transmitted by the data logger 330 may be a basis material for the income. In detail, when the income is less calculated than other days due to a small amount of supplying power, the owner of the photovoltaic device 300 may check a cause of the small amount of power generation from information on small solar insolation transmitted from the data logger 330. Like this, the sensing unit 319 and data logger 330 allow the photovoltaic device 300 to be efficiently managed and maintained.

Figure 4:
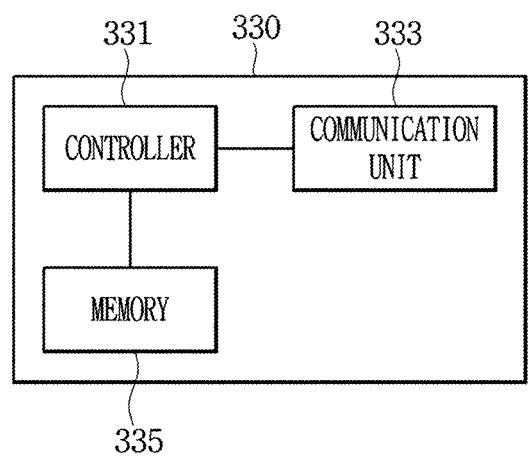
FIG. 4 is a block diagram of a data logger connected to a photovoltaic device according to another embodiment.

FIG. 4 is a block diagram of a data logger connected to a photovoltaic device according to another embodiment.

The data logger 330 includes a controller 331, a communication unit 333, and a storage unit 335.

The controller 331 controls an operation of the data logger 330.

The communication unit 333 receives, from the sensing unit 319, state information representing at least any one of a state and a surrounding environment state of the photovoltaic device 300. In addition, the communication unit 333 transmits the state information of the photovoltaic device 300 to the management server 350. At this point, the communication unit 333 may include a reception unit for receiving, from the sensing unit 319, the state information representing at least any one of the state and surrounding environment state of the photovoltaic device 300. In addition, the communication unit 333 may include a transmission unit for transmitting the state information of the photovoltaic device 300 to the management server 350.

The storage unit 335 stores information necessary for operation of the data logger 330. In detail, the storage unit 335 may store a state information group criterion for classifying state information groups that include the state information representing at least any one of the state and surrounding environment state of the photovoltaic device 300. At this point, the controller 331 may classify the state information groups in which the state information is included according to the state information group criterion by using the state information.

Figure 5:
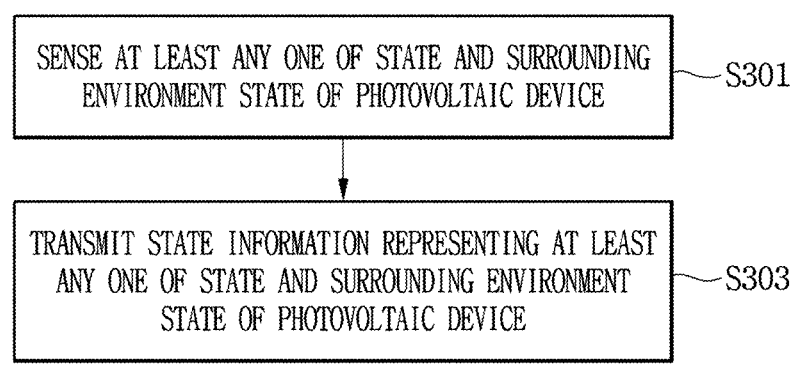
FIG. 5 is an operation flowchart of a photovoltaic device according to another embodiment.

FIG. 5 is an operation flowchart of a photovoltaic device according to another embodiment.

The sensing unit 319 senses at least any one of the state and surrounding environment state of the photovoltaic device 300 (operation S301). As described above, the sensing unit 319 may sense at least any one of a voltage of the power generated by the photovoltaic device 300, solar insolation and a temperature at a place where the photovoltaic device 300 is located, and a temperature in the photovoltaic device 300.

The sensing unit 319 transmits state information representing at least any one of the state and surrounding environment state of the photovoltaic device 300 (operation S303). In detail, the sensing unit 319 may transmit, to the data logger 330, the state information representing at least any one of the state and surrounding environment state of the photovoltaic device 300. In detailed embodiment, the sensing unit 319 may be connected to the inverter 303. At this point, the sensing unit 319 may receive information on power production from the inverter 303. In detail, the information on the power production may be information on instantaneous power generation including at least any one of an amount of instantaneous power generation, voltage of instantaneously generated power, and current of instantaneously generated power. In addition, the information on power production may be information on a generation history including an accumulated amount of power generation.

Figure 6:
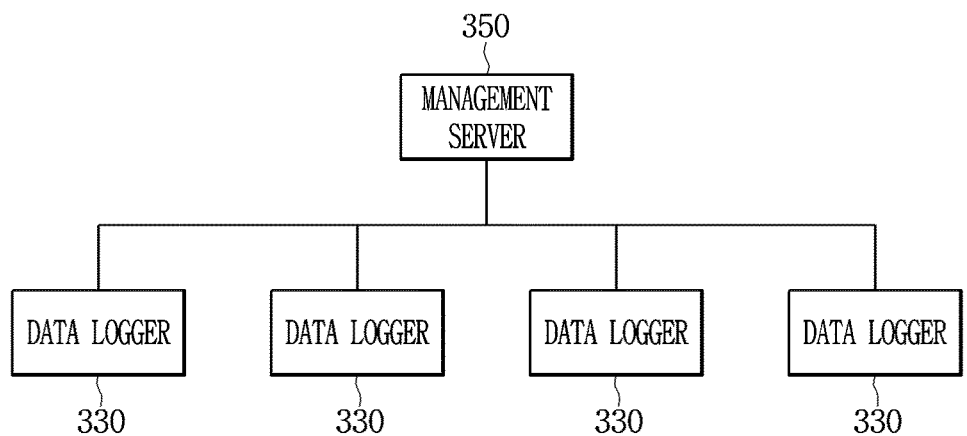
FIG. 6 illustrates connection relations between a plurality of data loggers and a management server.

FIG. 6 illustrates connection relations between a plurality of data loggers and a management server according to another embodiment.

The management server 350 receives the state information collected by each of the data loggers 330 from the plurality of data loggers 330. An owner or manager of the plurality of photovoltaic devices 300 accesses one management server 350 to check states, power generation histories, or the like of the plurality of photovoltaic devices 300. As the number of the data loggers 330 connected to the management server 350 becomes greater, their initial installment cost and maintenance cost may be reduced. However, when too many data loggers 330 transmit the state information to the management server 350, an amount of the state information transmitted from the data loggers 330 becomes great. Accordingly, congestion of communication lines may occur. In addition, when a bandwidth of communication line, through which the management server 350 is connected, is narrow, the number of the data loggers 330 connectable to the management server 350 is limited.

Figure 7:
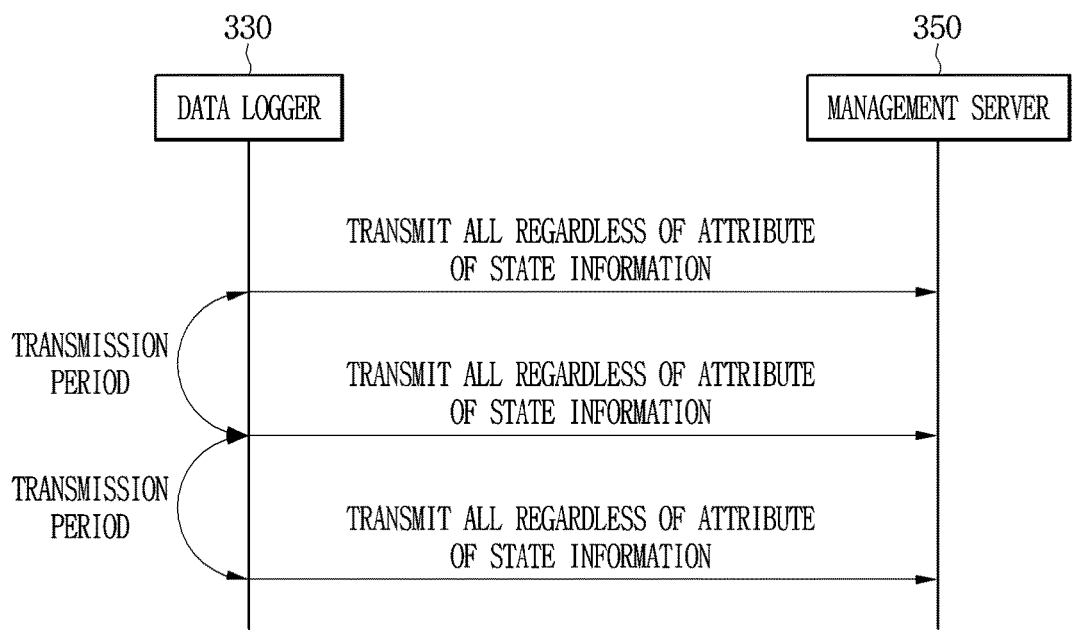
FIG. 7 illustrates that a data logger transmits state information to a management server according to another embodiment.

FIG. 7 illustrates that a data logger transmits state information to a management server according to another embodiment.

The data logger 330 transmits state information to the management server 350 at each transmission period. At this point, the transmission period represents a time interval that is a basis of transmission of the state information. In detail, the data logger 330 may transmit state information to the management server 350 at a certain transmission period. In detailed embodiment, in order to avoid traffic collision with other data loggers 330 that access the identical management server 350, the plurality of data loggers 330, which access the identical management server 350, may have different data transmission times with an identical transmission period. For example, there are first and second data loggers that transmit state information to the identical management server 350. At this point, both the first and second data loggers may transmit the state information at one hour interval of the identical transmission period. However, the first data logger may transmit the state information at 30 minutes of every hour and the second data logger may transmit the state information at every hour on the hour. Through this, the plurality of data loggers may avoid traffic collisions and minimize line congestions, even when the state information is transmitted according to an identical transmission period.

Figure 8:
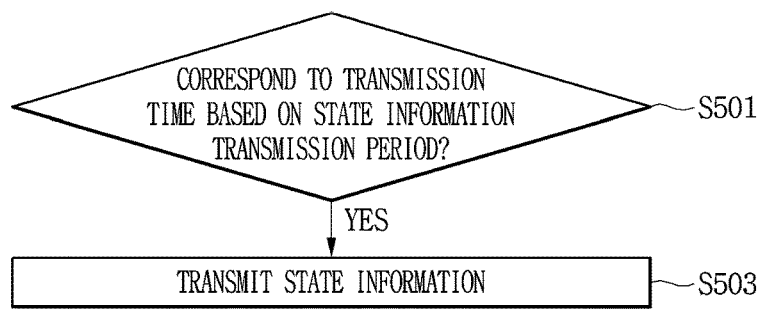
FIG. 8 is an operation flowchart of a data logger for transmitting state information according to another embodiment.

FIG. 8 is an operation flowchart of a data logger for transmitting state information according to another embodiment.

The controller 331 of the data logger 330 determines whether a current time corresponds to a transmission time based on a transmission period for transmitting the state information (operation S501). At this point, the transmission period may be a constant value as described above. In addition, each of the plurality of data loggers 330 connected to the identical management server 350 may have an identical transmission period. In addition, as described above, in a case of having the identical transmission period, each of the plurality of data loggers 330 connected to the identical management server 350 may avoid congestions of communication lines by differing the data transmission times at which the state information is transmitted.

When the current time corresponds to the transmission time based on the transmission period at which the state information is transmitted, the communication unit 333 of the data logger 330 transmits the state information to the management server 350.

As described above, the state information may represent at least any one of the state and surrounding environmental state of the photovoltaic device 300. Accordingly, the state information may include information having various characteristics. For example, the state information may include information on whether the photovoltaic device 300 is failed and an internal temperature of the photovoltaic device 300. In detail, a failure of the inverter 303 may correspond to the state information. In addition, the state information may include a generation history of the photovoltaic device 300. In detail, the state information may include an accumulated amount of power generation of the photovoltaic device 300. In addition, the state information may include instantaneous power generation information. In detail, the state information may include the amount of instantaneous power generation, voltage of instantaneously generated power, current of instantaneously generated power, and solar insolation.

Characteristics of these informations are all different. There is ever-changing information such as the amount of instantaneous power generation, and is also information requiring an immediate action, when abnormal information such as occurrence of failure is received. In addition, there is also information such as an accumulated amount of power generation that is not frequently changed or information not required to be frequently checked. Accordingly, when informations included in the state information are classified under a predetermined condition and transmitted at difference transmission periods, a data logger may efficiently use a limited bandwidth of a communication line by preventing congestion of the communication line from occurring. A description about this will be described with reference to FIGS. 9 and 10.

Figure 9:
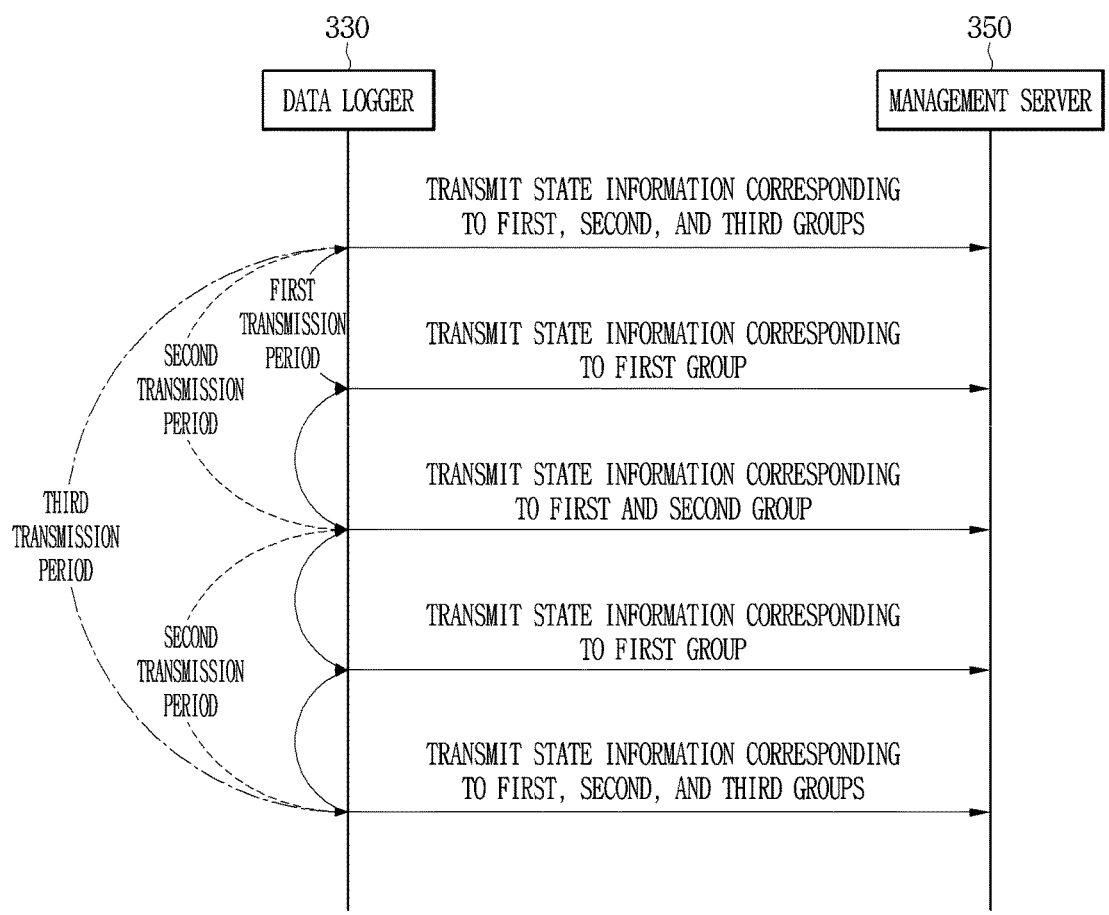
FIG. 9 illustrates that a data logger transmits state information to a management server according to another embodiment.

FIG. 9 illustrates that a data logger transmits state information to a management server according to another embodiment.

As described above, characteristics included in the state information are diversified. The data logger 330 may transmit state information at a transmission time on the basis of a state information group including the state information. In detail, the data logger 330 may divide the diverse informations into a plurality of groups through the controller 331. In particular, the data logger 330 may divide the diverse informations into the plurality of groups on the basis of a state information group criterion for classifying the state information group. In detailed embodiment, the storage unit 335 may include the state information group criterion. In addition, the data logger 330 may transmit the state information belonging to each group at different transmission periods based on characteristics of the plurality of groups through the communication unit 333. In detail, the data logger 330 may frequently transmit important information at a short transmission period. In addition, the data logger 330 may transmit information that is relatively less important but frequently changes at a longer period. In addition, the data logger 330 may transmit information that is relatively less important and slowly changes at a smaller period. For example, the state information may be divided into first, second, and third groups. A transmission period of the first group is shorter than that of the second group. A transmission period of the second group is shorter than that of the third group. In detailed embodiment, in case of the first transmission period, the information may be transmitted upon received. At this point, the second transmission period may be about 30 minutes. In addition, the third transmission period may be one day. Accordingly, the first group includes the most important information. For example, the first group may include information influencing system stability. In detail, the first group may include whether a failure occurs. The second group may include frequently changing information. In detail, the second group may include instantaneous power generation information. For example, the second group may include at least any one of voltage of instantaneously generated power, current of instantaneously generated power, and solar insolation. In addition, the third group may include information that is relatively less important or less frequently changing information. In detail, the third group may include information on accumulated power generation. For example, the third group may include at least any one of an accumulated amount of power generation and the accumulated number of use days of an element.

In detailed embodiment, the data logger 330 may transmit state information belonging to each group at different transmission periods based on characteristics of the plurality of groups through the communication unit 333. In another detailed embodiment, the data logger 330 may calculate a random value at different transmission periods on the basis of characteristics of the plurality of groups to transmit the state information belonging to each group based on the calculated random value through the communication unit 333. For example, when the transmission period is about 10 minutes, a randomly calculated value may be 0 to about 10 min. At this point, the data logger 330 may transmit the state information at a time delayed by the randomly calculated value from a time of arrival of the transmission period. In detail, when the randomly calculated value is about 3 minutes, the data logger 330 may transmit the state information after 3 minutes from the time corresponding to the transmission period.

In the embodiment of FIG. 9, the data logger 330 transmits the state information corresponding to the first group at the first transmission period. In addition, the data logger 330 transmits the state information corresponding to the second group at the second transmission period that is longer than the first transmission period. In addition, the data logger 330 transmits the state information corresponding to the second group at the third transmission period that is longer than the second transmission period. Although FIG. 9 illustrates the first, second, and third periods are in multiple relations, all embodiments are not limited thereto.

Figure 10:
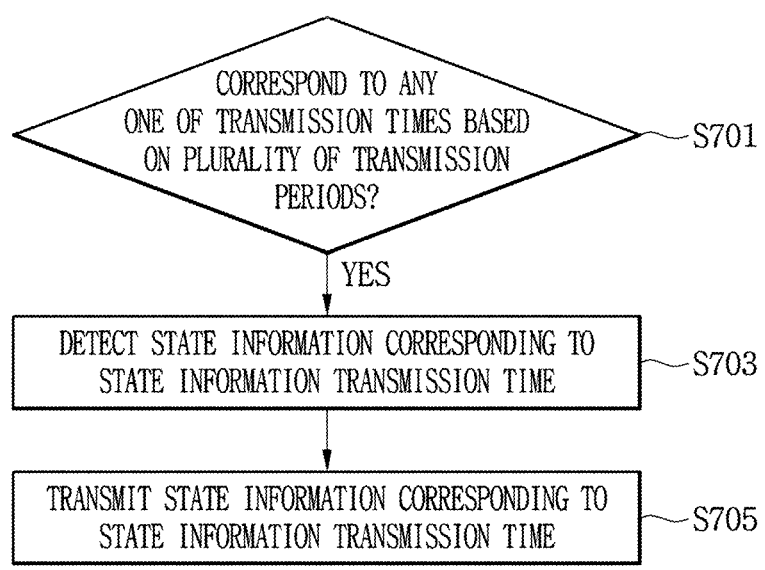
FIG. 10 is an operation flowchart of a data logger for transmitting state information according to another embodiment.

FIG. 10 is an operation flowchart of a data logger for transmitting state information according to another embodiment.

The data logger 330 may transmit state information on the basis of a state information group including the state information. The data logger 330 may transmit state information according to a transmission time on the basis of a state information group including the state information. This may be performed according to the following operation.

The data logger 330 transmits the state information at a state information transmission time based on the transmission period of each of the plurality of state information group through the controller 331. This is performed through the following operation.

The data logger 330 determines whether it is a state information transmission time based on the transmission period of each of the plurality of state information group through the controller 331 (operation S701). As described in relation to FIG. 9, the state information transmission time may be a transmission period differed based on a characteristic of each of a plurality of groups or may be based on a random value calculated in different transmission periods based on the characteristics of the plurality of groups. In addition, the plurality of state information groups may have different transmission periods according to the characteristics of the plurality of state information groups. To this end, the data logger 330 may classify the state information group including the state information according to the state information group criterion through the controller 331. At this point, the storage unit 335 stores the state information group criterion, and the controller 331 may classify the state information group including the state information according to the stored state information group criterion. In another detailed embodiment, when transmitting the state information, the sensing unit 319 may transmit the state information group including the state information together. At this point, the controller 331 may determine whether it is the state information transmission time on the basis of the received state information group.

The data logger 330 detects the state information corresponding to the state information transmission time through the controller 331 (operation S703).

The data logger 330 transmits the state information corresponding to the state information transmission time through the controller 333 (operation S705).

The data logger 330 may most efficiently use a limited bandwidth of the communication line through this operation. In addition, the data logger 330 may reduce an installment cost and maintenance cost by allowing one management server 350 to manage the data loggers 330 as many as possible.

The embodiments may provide a data collecting device for efficiently and accurately collect a state of a photovoltaic device to allow the photovoltaic device to be efficiently and precisely managed.

In the foregoing, features, structures, or effects described in connection with embodiments are included in at least one embodiment, and are not necessarily limited to one embodiment. Furthermore, the exemplified features, structures, or effects in various embodiments can be combined and modified by those skilled in the art. Accordingly, contents in connection with these combination and modification should be construed to fall in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A data collecting device collecting state information of a photovoltaic device, the data collecting device comprising:
   a controller;
   a transmitter;
   a receiver; and
   a memory device storing state information grouping criterion and a plurality of instructions that when executed by the controller, cause the controller to:
   receive the state information via the receiver;
   group the received state information into a plurality of groups of the state information, wherein the groups are defined based on the stored state information grouping criterion;
   calculate a random value for each group of the plurality of groups at different transmission periods on the basis of characteristics of the plurality of groups, creating a calculated random value; and
   transmit the state information belonging to each group of the plurality of groups based on the calculated random value via the transmitter to a management server, wherein each group of the plurality of groups of the state information is transmitted at different transmission intervals and the different transmission intervals are defined based on the stored state information grouping criterion;
   wherein the plurality of groups of state information comprises:
   a first state information group comprising failure information and information regarding system stability of the photovoltaic device;
   a second state information group comprising instantaneous power generation information, wherein the instantaneous power generation information includes a voltage of instantaneously generated power, a current of instantaneously generated power, and solar insolation of the photovoltaic device; and
   a third state information group comprising accumulated power generation information, wherein the accumulated power generation information includes at least one of an accumulated amount of power and an accumulated number of days of use,
   wherein a transmission interval of the first state information group is shorter than a transmission interval of the second state information group, and the transmission interval of the second state information group is shorter than a transmission interval of the third state information group.

2. The data collecting device according to claim 1, wherein:
the failure information comprises information on whether an inverter for inverting DC power to AC power has failed.

3. The data collecting device according to claim 1, wherein the controller is further configured to initiate transmission of the plurality of groups of the state information after a time period of random length after a first transmission following a previous transmission time.

4. An operation method of a data collecting device collecting state information of a photovoltaic device, the operation method comprising:
   receiving the state information;
   classifying the received state information into a plurality of groups of the state information, wherein the groups are defined based on a stored state information grouping criterion;
   calculating a random value for each group of the plurality of groups at different transmission periods on the basis of characteristics of the plurality of groups, creating a calculated random value; and
   transmitting the state information belonging to each group of the plurality of groups based on the calculated random value to a management server, wherein each group of the plurality of groups of the state information is transmitted at different transmission intervals and the different transmission intervals are defined based on the stored state information grouping criterion, wherein the plurality of groups of state information comprises:
   a first state information group comprising failure information and information regarding system stability of the photovoltaic device;
   a second state information group comprising instantaneous power generation information, wherein the instantaneous power generation information includes a voltage of instantaneously generated power, a current of instantaneously generated power, and solar insolation of the photovoltaic device; and
   a third state information group comprising accumulated power generation information, wherein the accumulated power generation information includes at least one of an accumulated amount of power and an accumulated number of days of use,
   wherein a transmission interval of the first state information group is shorter than a transmission interval of the second state information group, and the transmission interval of the second state information group is shorter than a transmission interval of the third state information group.

5. The operation method according to claim 4, wherein:
the failure information comprises information on whether an inverter for inverting DC power to AC power has failed.

6. The operation method according to claim 4, wherein transmitting the plurality of groups of the state information is initiated after a time period of random length after a first transmission following a previous transmission time.

* * * * *